United States Patent
Furuya (10) Patent No.: US 10,808,596 B2
(45) Date of Patent: Oct. 20, 2020

(54) INTERNAL COMBUSTION ENGINE COOLING DEVICE

(71) Applicant: TOYOTA JIDOSHA KABUSHIKI KAISHA, Toyota (JP)

(72) Inventor: Yoshihiro Furuya, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 16/703,138

(22) Filed: Dec. 4, 2019

(65) Prior Publication Data

US 2020/0240316 A1    Jul. 30, 2020

(30) Foreign Application Priority Data

Jan. 25, 2019    (JP) .................. 2019-011405

(51) Int. Cl.
| | |
|---|---|
| F01P 7/14 | (2006.01) |
| F16K 31/04 | (2006.01) |
| G01L 3/00 | (2006.01) |
| G01P 3/44 | (2006.01) |
| G01P 15/16 | (2013.01) |

(52) U.S. Cl.
CPC .............. *F01P 7/14* (2013.01); *F16K 31/043* (2013.01); *G01L 3/00* (2013.01); *G01P 3/44* (2013.01); *G01P 15/165* (2013.01); *F01P 2007/146* (2013.01); *F01P 2023/08* (2013.01); *F01P 2025/60* (2013.01)

(58) Field of Classification Search
CPC .... F01P 7/14; F01P 2007/146; F01P 2023/08; F01P 2025/60; F01P 2023/00; F16K 31/043; F16K 31/045; G01L 3/00; G01P 3/44; G01P 15/165
See application file for complete search history.

(56) References Cited

U.S. PATENT DOCUMENTS

| | | | |
|---|---|---|---|
| 6,223,700 B1 | 5/2001 | Sano et al. | |
| 2011/0303860 A1* | 12/2011 | Uda | F16K 31/043 |
| | | | 251/129.01 |
| 2016/0376977 A1 | 12/2016 | Watanabe | |
| 2017/0030251 A1 | 2/2017 | Watanabe | |
| 2018/0066567 A1 | 3/2018 | Kaneko et al. | |

FOREIGN PATENT DOCUMENTS

| | | |
|---|---|---|
| JP | 11-287123 A | 10/1999 |
| JP | 2017-008824 A | 1/2017 |
| JP | 2017-031817 A | 2/2017 |
| JP | 2018-040289 A | 3/2018 |

* cited by examiner

*Primary Examiner* — Jacob M Amick (74) *Attorney, Agent, or Firm* — Oblon, McClelland, Maier & Neustadt, L.L.P.

(57) ABSTRACT

A cooling device of an internal combustion engine includes a control valve that regulates the flow of a cooling liquid in a circulation circuit, and an electronic control unit. The electronic control unit is configured to have the following functions: controlling driving of a motor of the control valve; determining whether or not the shifting speed of a valve body of the control valve has decreased rapidly; calculating a motor torque based on an effective voltage applied to the motor; deriving a collision factor based on a smoothed angular speed value; and when the electronic control unit determines that the shifting speed of the valve body has decreased rapidly, calculating a rapid-decrease-caused stress so as to become larger as a product of the motor torque and the collision factor becomes larger.

7 Claims, 7 Drawing Sheets

INTERNAL COMBUSTION ENGINE COOLING DEVICE

CROSS-REFERENCE TO RELATED APPLICATIONS

This application claims priority to Japanese Patent Application No. 2019-011405 filed on Jan. 25, 2019, which is incorporated herein by reference in its entirety.

BACKGROUND

1. Technical Field

The present disclosure relates to an internal combustion engine cooling device.

2. Description of Related Art

Japanese Patent Application Publication No. 2018-40289 (JP 2018-40289 A) describes an example of an internal combustion engine cooling device including a control valve that controls the flow of a cooling liquid, flowing inside the internal combustion engine, in a circulation circuit, and a control unit that controls the control valve. The control valve has a housing, a valve body housed inside the housing, a motor controlled by the control unit, and a plurality of gears that transmits an output torque of the motor to the valve body. By having the motor driven to shift the valve body, the control valve can control the flow of the cooling liquid in the circulation circuit.

SUMMARY

A foreign object may enter inside the housing of the control valve along with the cooling liquid. If a foreign object enters inside the housing while the motor is being driven and the valve body is shifting accordingly, the shifting of the valve body may be restricted due to the foreign object getting caught in the control valve, resulting in a rapid decrease in the shifting speed of the valve body. Since the shifting of the valve body is restricted despite the motor being driven to shift the valve body, an impact resulting from the rapid decrease in the shifting speed of the valve body is input into the meshing gears. To infer the durability of the control valve, it is necessary to calculate the stress that the gears experience upon input of such an impact. However, JP 2018-40289 A does not disclose a method of estimating and calculating the magnitude of the stress that the gears experience when shifting of the valve body is restricted due to a foreign object getting caught in the control valve.

The present disclosure provides an internal combustion engine cooling device that can calculate a stress that gears of a control valve inside the cooling device experience when shifting of a valve body is restricted due to a foreign object getting caught in the control valve.

An aspect of the present disclosure relates to an internal combustion engine cooling device including a control valve and an electronic control unit. The control valve is provided in a circulation circuit of a cooling liquid flowing inside the internal combustion engine, and includes a housing, a valve body that shifts inside the housing, a motor, and a transmission mechanism that has a plurality of gears meshing with one another and is configured to transmit an output of the motor to the valve body. The control valve is configured to control the flow of the cooling liquid in the circulation circuit by having the motor driven to shift the valve body. The electronic control unit is configured to: (i) control driving of the motor; (ii) derive an angular speed of the motor; (iii) derive an angular acceleration rate that is an amount of change in the angular speed of the motor; (iv) when the angular acceleration rate while the motor is driven to adjust the position of the valve body is equal to or lower than a criterial acceleration rate, determine that the shifting speed of the valve body has decreased rapidly; (v) based on an effective voltage applied to the motor, calculate a motor torque that is a torque generated by the motor; (vi) derive a collision factor so as to become larger as a smoothed angular speed value that is a value obtained by smoothing the angular speed becomes larger; and (vii) when the electronic control unit determines that the shifting speed of the valve body has decreased rapidly, calculate a rapid-decrease-caused stress that is a stress that the gears experience as a result of a rapid decrease in the shifting speed of the valve body, so as to become larger as a product of the motor torque and the collision factor becomes larger.

If a foreign object enters inside the housing of the control valve along with the cooling liquid, and the shifting of the valve body is restricted due to the foreign object getting caught in the control valve, the shifting speed of the valve body decreases rapidly despite a torque being output from the motor. Then, an impact resulting from the rapid decrease in the shifting speed is input into the gears inside the transmission mechanism that is located between the motor and the valve body in the torque transmission path.

The stress that the gears experience upon input of such an impact tends to become larger as the motor torque generated by the motor becomes larger. Moreover, this stress tends to become larger as the angular speed immediately before the rapid decrease in the shifting speed of the valve body becomes higher.

In the above configuration, therefore, the motor torque is calculated based on the effective voltage applied to the motor, and the collision factor is calculated based on the smoothed angular speed value of the motor. Then, the rapid-decrease-caused stress is calculated so as to become larger as the product of the collision factor and the motor torque becomes larger. This configuration can make the collision factor larger as the angular speed immediately before the rapid decrease in the shifting speed of the valve body becomes higher. Therefore, this configuration can make the rapid-decrease-caused stress larger as the motor torque becomes larger and as the angular speed immediately before the rapid decrease in the shifting speed of the valve body becomes higher. Thus, it is possible to calculate the stress that the gears experience when shifting of the valve body is restricted due to a foreign object getting caught in the control valve.

In the cooling device of the above aspect, the electronic control unit may be further configured to: (viii) derive a basic torque so as to become larger as the effective voltage becomes higher; (ix) derive a correction factor so as to become larger as the effective voltage becomes higher and as the smoothed angular speed value becomes smaller; and (x) calculate the motor torque so as to become larger as the product of the basic torque and the correction factor becomes larger.

The basic torque is derived as a torque that is generated by the motor when the effective voltage is applied to the motor under the condition that the angular speed of the motor is equal to a specified value. The basic torque becomes larger as the effective voltage applied to the motor becomes higher.

The angular speed of the motor tends to become higher as the effective voltage applied to the motor becomes higher. The gap between the basic torque and a torque that is actually being generated by the motor tends to become wider, as the deviation of the current angular speed from the aforementioned specified value that is the angular speed used to derive the basic torque becomes larger. For example, when the current angular speed is higher than the specified value, the motor torque becomes smaller as the difference between the specified value and the current angular speed becomes larger. Thus, it is possible to calculate the motor torque by correcting the basic torque with the gap between the basic torque and the torque being actually generated by the motor taken into account.

In the above configuration, therefore, the electronic control unit derives the correction factor so as to become larger as the effective voltage becomes higher and as the smoothed angular speed value becomes smaller. Since the smoothed angular speed value is a value reflecting the current angular speed, this configuration can set the correction factor to a value according to the gap between the basic torque and the torque being actually generated by the motor. The motor torque is calculated based on the product of this correction factor and the basic torque. It is therefore possible to calculate the motor torque with good accuracy even when the shifting speed of the valve body decreases rapidly due to a foreign object getting caught in the control valve.

The hardness of a constituent member of the control valve varies with the temperature of the constituent member. The hardness of the constituent member affects the magnitude of the stress that the gears experience when shifting of the valve body is restricted due to a foreign object getting caught in the control valve. Therefore, the electronic control unit in the configuration of the above aspect may be configured to: (xi) derive the basic torque based on the effective voltage and on the temperature of a constituent member of the control valve or a value correlated with the temperature of the constituent member. By deriving the motor torque based on the basic torque thus calculated, the electronic control unit having this configuration can set the rapid-decrease-caused stress to a value that takes the hardness of the constituent member into account.

In the cooling device of the above aspect, the electronic control unit may be configured to: (xii) derive the angular speed once every control cycle; and (xiii) when the angular acceleration rate while the motor is driven to adjust the position of the valve body is equal to or lower than a criterial acceleration rate and, moreover, a last-time value of the angular speed is equal to or higher than a reference angular speed, determine that the shifting speed of the valve body has decreased rapidly.

Even when shifting of the valve body is restricted due to a foreign object getting caught in the control valve, the impact input into the gears is small if the angular speed of the motor before the restriction occurs is not so high. Therefore, the rapid-decrease-caused stress need not be calculated if the angular speed of the motor before the restriction occurs is not so high.

Moreover, even when shifting of the valve body is restricted due to a foreign object getting caught in the control valve, the impact input into the gears is small if the amount of decrease in the angular speed of the motor between before and after the restriction occurs is small. Therefore, the rapid-decrease-caused stress need not be calculated if the amount of decrease in the angular speed of the motor between before and after the restriction occurs is small, i.e., if the absolute value of the angular acceleration rate, even when it has a negative value, is small.

In the above configuration, therefore, it is determined that the shifting speed of the valve body has decreased rapidly, when the angular acceleration rate of the motor is equal to or lower than the criterial acceleration rate, i.e., the absolute value of the angular acceleration rate that has a negative value is large, and, moreover, the last-time value of the angular speed of the motor is equal to or higher than the reference speed. Thus, it is possible to avoid calculating the rapid-decrease-caused stress in the case where the shifting speed of the valve body has decreased but it is assumed that the impact input into the gears is small and that no stress will build up in the gears.

In the cooling device of the above aspect, the electronic control unit may be configured to: (xiv) calculate an index of the durability of the control valve; (xv) set the effective value lower as the durability of the control valve estimated based on the index becomes lower; and (xvi) integrate the rapid-decrease-caused stress, and calculate the index so as to have a value indicating lower durability of the control valve as the integrated value becomes larger.

When the integrated value of the rapid-decrease-caused stress calculated as described above is larger, it can be inferred that a larger amount of damage has built up in the gears. As the amount of built-up damage increases, the durability of the control valve decreases. In this regard, the electronic control unit having the above configuration calculates the index based on the integrated value of the rapid-decrease-caused stress calculated as described above. The effective voltage is set lower when the durability of the control valve estimated based on this index is lower than when the durability is higher. Thus, the load on the transmission mechanism during driving of the motor can be kept from increasing when the durability has become lower, compared with when the durability has not become lower. As a result, the product life of the control valve can be extended.

When the rapid-decrease-caused stress calculated as described above is small, it can be inferred that the impact input into the gears is small and that little stress will actually build up in the gears. Therefore, the electronic control unit in the cooling device of the above aspect may (xvii) set the rapid-decrease-caused stress to zero when the calculated rapid-decrease-caused stress is smaller than a criterial value.

In the cooling device of the above aspect, the electronic control unit may be configured to: (xviii) calculate the index so as to have a value indicating lower durability of the control valve as the number of times the rapid-decrease-caused stress has become equal to or larger than the criterial value is larger.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
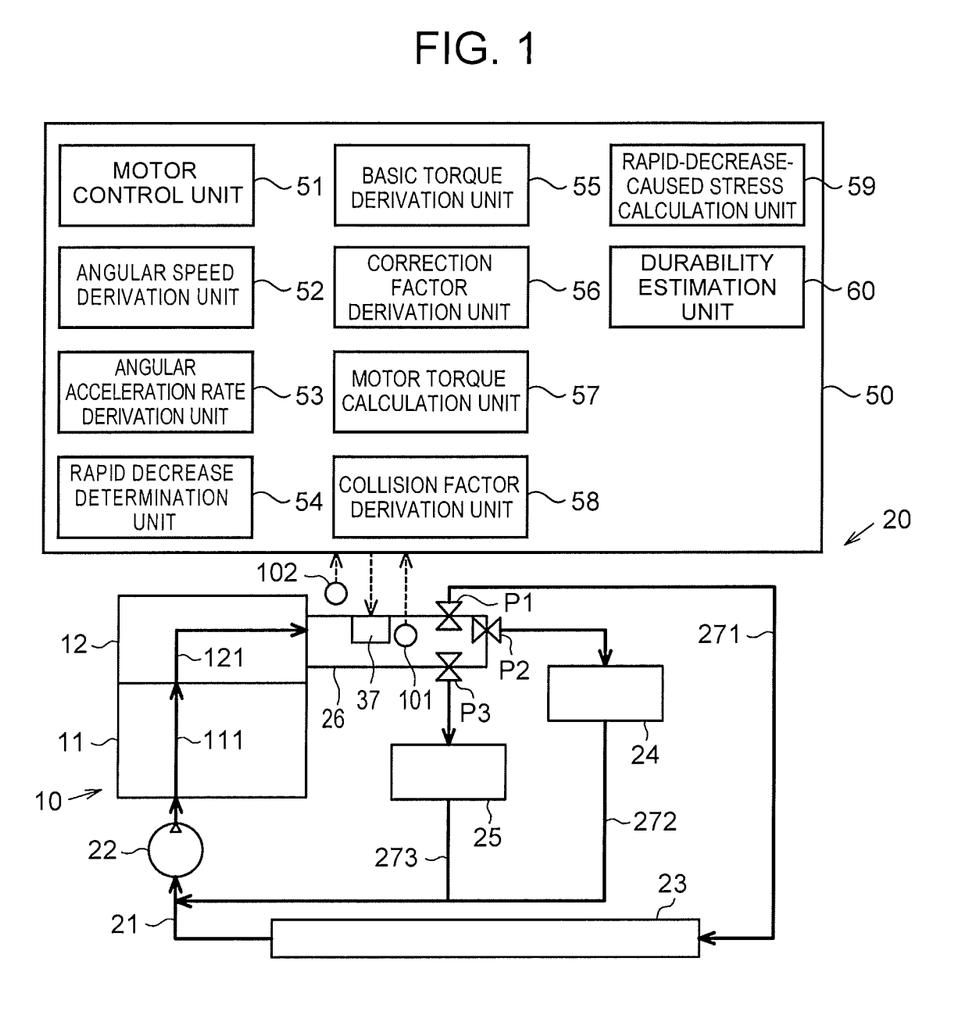
FIG. 1 is a view showing a schematic configuration of an internal combustion engine cooling device according to the present disclosure, and a functional configuration of an electronic control unit of the cooling device.

An embodiment of an internal combustion engine cooling device will be described below in accordance with FIG. 1 to FIG. 9. As shown in FIG. 1, a cooling device 20 includes a circulation circuit 21 through which circulates a cooling liquid that flows through a water jacket 111 inside a cylinder block 11 and a water jacket 121 inside a cylinder head 12 in an internal combustion engine 10. Provided in the circulation circuit 21 are: a pump 22 that discharges the cooling liquid toward the water jacket 111 inside the cylinder block 11; a radiator 23 that cools the cooling liquid; various devices 24 to be cooled, including a throttle valve and an EGR valve; and a heater core 25 of an air conditioner of the vehicle.

In the circulation circuit 21, a control valve 26 is provided into which the cooling liquid having flowed out of the water jacket 121 inside the cylinder head 12 flows. The control valve 26 has three output ports P1, P2, P3 through which the cooling liquid having flowed into the control valve 26 flows out. The radiator port P1 of the three output ports P1 to P3 is connected to a first cooling liquid passage 271 through which the cooling liquid flows via the radiator 23. The device port P2 of the three output ports P1 to P3 is connected to a second cooling liquid passage 272 through which the cooling liquid flows via the various devices 24. The heater port P3 of the three output ports P1 to P3 is connected to a third cooling liquid passage 273 through which the cooling liquid flows via the heater core 25.

Figure 2:
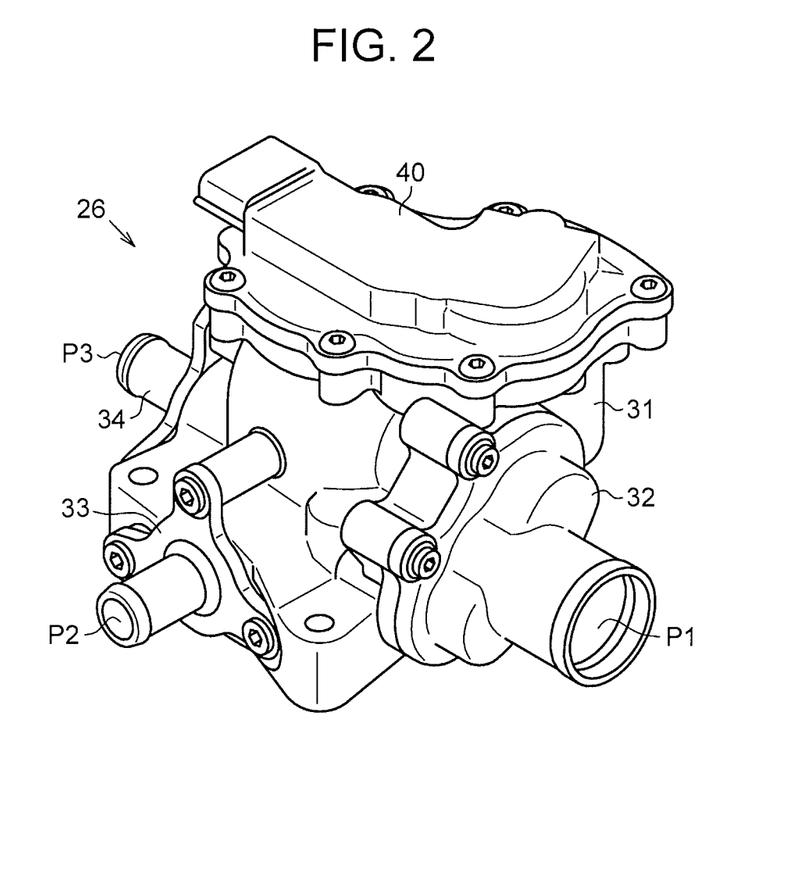
FIG. 2 is a perspective view showing a control valve of the cooling device.

As shown in FIG. 2, the control valve 26 includes a housing 31 that forms the framework of the control valve 26. The housing 31 has a first connector member 32, a second connector member 33, and a third connector member 34 mounted thereon. The first connector member 32 has the radiator port P1. The second connector member 33 has the device port P2. The third connector member 34 has the heater port P3. When the connector members 32 to 34 have been mounted on the housing 31, the output ports P1 to P3 are disposed at different positions from one another.

Figure 3:
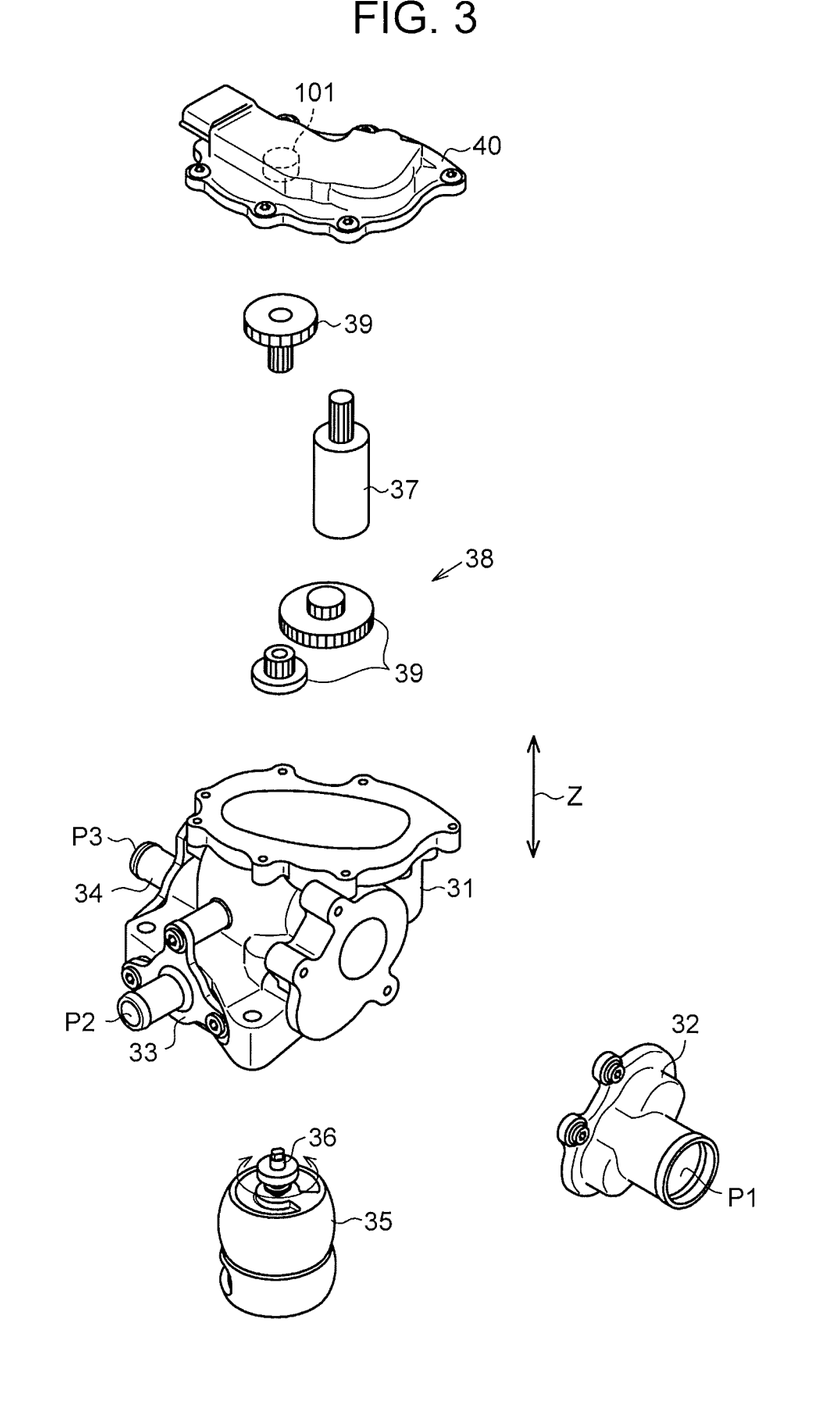
FIG. 3 is an exploded perspective view of the control valve.

As shown in FIG. 3, the control valve 26 includes a valve body 35 housed inside the housing 31. A cooling liquid passage is formed in the valve body 35. A shaft 36 extending in an axial direction Z of the housing 31 is coupled to the valve body 35. The valve body 35 rotates (shifts) around the shaft 36 as indicated by the arrow in FIG. 3. When the valve body 35 rotates and an angle ANG of the valve body 35 relative to the housing 31 changes, the amount of overlap between the cooling liquid passage formed in the valve body 35 and each of the output ports P1 to P3 changes, which in turn causes a change in the flow rate of the cooling liquid through each of the output ports P1 to P3. Thus, the flow of the cooling liquid in the circulation circuit 21 can be controlled as the valve body 35 rotates.

The control valve 26 further includes a motor 37 and a transmission mechanism 38, both housed inside the housing 31. The transmission mechanism 38 transmits an output of the motor 37 to the shaft 36 of the valve body 35. Specifically, the transmission mechanism 38 has a plurality of gears 39 meshing with one another. In this embodiment, the gears 39 are made of synthetic resin. The valve body 35 rotates as a torque output from the motor 37 is input into the shaft 36 through the gears 39.

A cover 40 is mounted on the housing 31 so as to cover the part where the motor 37 and the transmission mechanism 38 are housed. A rotation angle sensor 101 that detects the rotation angle of the motor 37 is provided inside the cover 40.

Figure 4:
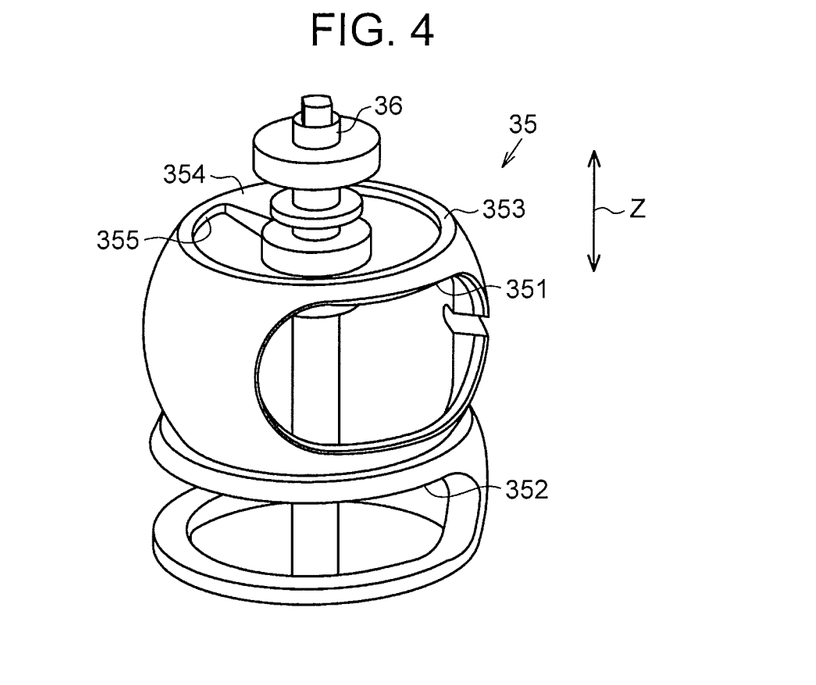
FIG. 4 is a perspective view showing a valve body of the control valve.

As shown in FIG. 4, the valve body 35 has a shape of two barrel-shaped bodies placed one on top of the other in the axial direction Z of the housing 31. Two holes 351, 352 are formed in a side wall of the valve body 35, side by side in the axial direction Z. These holes 351, 352 form part of the cooling liquid passage provided in the valve body 35. Of the two holes 351, 352, the first hole 351 located on the upper side in FIG. 4 communicates with the radiator port P1 when the angle of the valve body 35 relative to the housing 31 is within a certain range. While the first hole 351 communicates with the radiator port P1, the cooling liquid having flowed into the control valve 26 flows out of the radiator port P1. Of the two holes 351, 352, the second hole 352, separate from the first hole 351, communicates with at least one of the device port P2 and the heater port P3 when the angle of the valve body 35 relative to the housing 31 is within another certain range. While the second hole 352 communicates with the device port P2, the cooling liquid having flowed into the control valve 26 flows out of the device port P2. While the second hole 352 communicates with the heater port P3, the cooling liquid having flowed into the control valve 26 flows out of the heater port P3.

When the wall of the valve body 35 on the upper side in FIG. 4 is referred to as an upper wall 353 of the valve body 35, the shaft 36 is connected to the upper wall 353. The upper wall 353 is provided with an arc-shaped groove 355 that extends around a root of the shaft 36 so as to leave a portion of the upper wall 353 as an engaging portion 354.

Figure 5:
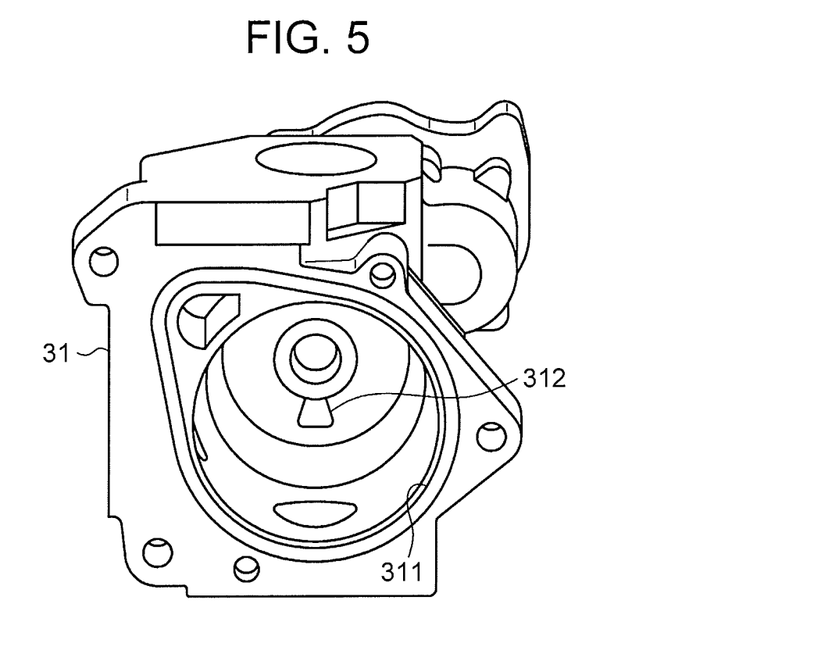
FIG. 5 is a perspective view showing a housing of the control valve.

FIG. 5 is a perspective view of the housing 31 as seen from an insertion direction of the valve body 35. To assemble the control valve 26, the valve body 35 is inserted into the housing 31 through a housing opening 311. A stopper 312 to be housed in the groove 355 is provided at a portion of the housing 31 that faces the upper wall 353 of the valve body 35. Thus, when the valve body 35 is housed inside the housing 31, the rotation of the valve body 35 relative to the housing 31 is restricted as the engaging portion 354 of the valve body 35 comes into contact with the stopper 312. In other words, a range in which the engaging portion 354 does not come into contact with the stopper 312 is a range in which the valve body 35 is allowed to rotate relative to the housing 31.

The cooling liquid flows through the housing opening 311 into the housing 31 of the control valve 26 thus configured. Thus, the housing opening 311 functions as an input port of the control valve 26. The cooling liquid having flowed into the housing 31 flows through the cooling liquid passage provided in the valve body 35 and is guided to the output ports P1 to P3.

Figure 6:
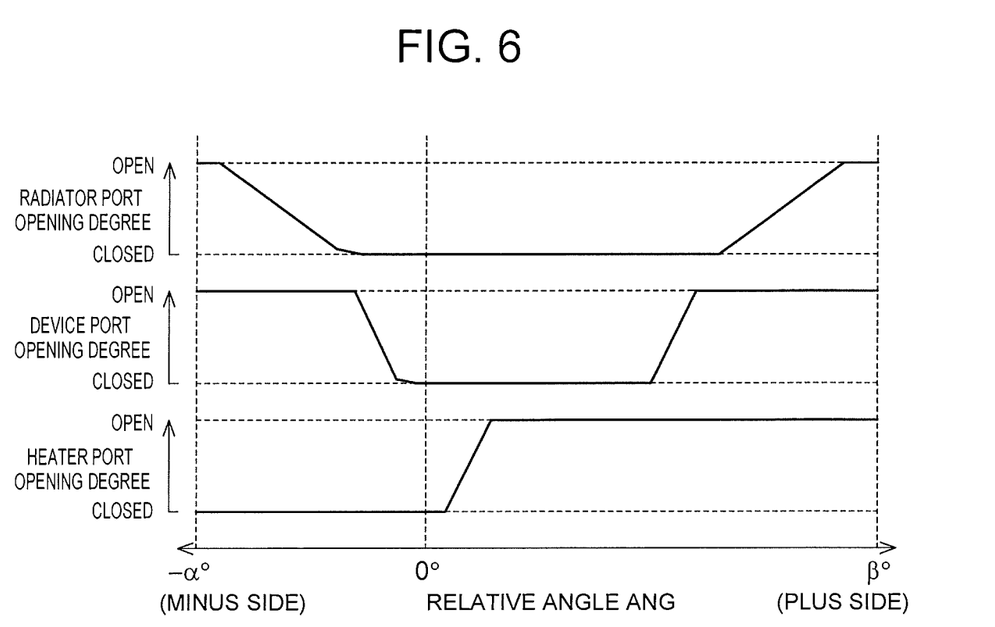
FIG. 6 is a graph showing a relation between the angle of the valve body relative to the housing and the opening degree of each port in the control valve.

FIG. 6 is a graph showing a relation between the angle ANG of the valve body 35 relative to the housing 31 and the opening degree of each of the output ports P1 to P3. When the relative angle ANG at which all the output ports P1 to P3 are closed is "0°," the valve body 35 of the control valve 26 can be rotated relative to the housing 31, in both a plus direction and a minus direction, until the stopper 312 of the housing 31 and the engaging portion 354 of the valve body 35 come into contact with each other. The size and position of the holes 351, 352 of the valve body 35 are set such that the opening degrees of the output ports P1 to P3 change as shown in FIG. 6 as the relative angle ANG changes. In this embodiment, the relative angle ANG increases when the valve body 35 is rotated relative to the housing 31 in the plus direction, and decreases when the valve body 35 is rotated relative to the housing 31 in the minus direction.

In the control valve 26, when the valve body 35 is relatively rotated in the plus direction from the position at which the relative angle is 0°, the heater port P3 starts to open first, and the opening degree of the heater port P3 increases gradually as the relative angle ANG increases. When the relative angle ANG increases further after the heater port P3 is fully opened, the device port P2 opens next. The opening degree of the device port P2 increases as the relative angle ANG increases, and the radiator port P1 starts to open after the device port P2 is fully opened. The opening degree of the radiator port P1 also increases as the relative angle ANG increases. When the relative angle at which the engaging portion 354 and the stopper 312 come into contact with each other is "+β°," the radiator port P1 is fully opened shortly before the valve body 35 reaches a position at which the relative angle ANG is +β°. Until the valve body 35 reaches the position at which the relative angle ANG is +β°, the output ports P1 to P3 are kept fully open even when the relative angle ANG increases.

On the other hand, in the control valve 26, the heater port P3 does not open when the valve body 35 is relatively rotated in the minus direction from the position at which the relative angle ANG is 0°. In this case, the device port P2 starts to open first, and the opening degree of the device port P2 increases gradually as the relative angle ANG decreases. When the relative angle ANG decreases further after the device port P2 is fully opened, the radiator port P1 opens. The opening degree of the radiator port P1 increases as the relative angle ANG decreases. When the relative angle at which the engaging portion 354 and the stopper 312 come into contact with each other is "−α°," the radiator port P1 is fully opened shortly before the valve body 35 reaches a position at which the relative angle ANG is −α°. Until the valve body 35 reaches the position at which the relative angle ANG is −α°, the radiator port P1 and the device port P2 are kept fully open even when the relative angle ANG decreases.

Next, the configuration of control performed by the cooling device 20 will be described with reference to FIG. 1, FIG. 7, and FIG. 8. As shown in FIG. 1, detection signals from various sensors, including the rotation angle sensor 101 of the control valve 26 and a cooling liquid temperature sensor 102, are input into an electronic control unit 50 of the cooling device 20. The rotation angle sensor 101 outputs a signal according to a rotation angle θ of an output shaft of the motor 37 as a detection signal. The cooling liquid temperature sensor 102 detects an outlet cooling liquid temperature Twt that is the temperature of the cooling liquid having flowed out of the cylinder head 12, and outputs a signal according to the outlet cooling liquid temperature Twt as a detection signal.

If a foreign object flows into the housing 31 of the control valve 26 along with the cooling liquid, the rotation of the valve body 35 may be restricted due to the foreign object getting caught in the control valve 26. In this case, the rotation speed (shifting speed) of the valve body 35 decreases rapidly, and an impact resulting from the rapid decrease in the rotation speed of the valve body 35 may be input into the gears 39 that are disposed in the torque transmission path from the motor 37, serving as a power source, to the valve body 35. Therefore, when it is determined that the rotation speed of the valve body 35 has decreased rapidly due to a foreign object getting caught in the control valve 26, the electronic control unit 50 in this embodiment calculates a rapid-decrease-caused stress STRstp that is a stress that the gears 39 experience upon input of the impact. Then, the electronic control unit 50 estimates the durability of the control valve 26 based on the calculated rapid-decrease-caused stress STRstp, and reflects the estimation result of the durability in controlling the motor 37.

The electronic control unit 50 has, as functional units that realize control of the motor 37 with the durability of the control valve 26 taken into account, a motor control unit 51, an angular speed derivation unit 52, an angular acceleration rate derivation unit 53, a rapid decrease determination unit 54, a basic torque derivation unit 55, a correction factor derivation unit 56, a motor torque calculation unit 57, a collision factor derivation unit 58, a rapid-decrease-caused stress calculation unit 59, and a durability estimation unit 60.

The motor control unit 51 controls driving of the motor 37. Specifically, the motor control unit 51 determines a duty ratio DT of a voltage signal to be input into the motor 37. Then, the motor control unit 51 generates a voltage signal of the determined duty ratio DT and inputs the voltage signal into the motor 37. How to determine the duty ratio DT will be described in detail later.

The angular speed derivation unit 52 derives an angular speed ω of the output shaft of the motor 37 once every predetermined control cycle. Specifically, the angular speed derivation unit 52 derives the angular speed ω of the motor 37 by differentiating, with respect to time, the rotation angle θ of the motor 37 derived based on the detection signal from the rotation angle sensor 101.

The angular acceleration rate derivation unit 53 derives an angular acceleration rate Dω of the motor 37 as an amount of change in the angular speed ω of the motor 37. Specifically, the angular acceleration rate derivation unit 53 derives the angular acceleration rate Dω by differentiating, with respect to time, the angular speed ω derived by the angular speed derivation unit 52. The angular acceleration rate Dω has a positive value when the angular speed ω is increasing, and has a negative value when the angular speed ω is decreasing.

When the motor 37 is driven to rotate the valve body 35, the rapid decrease determination unit 54 determines whether or not the rotation speed (shifting speed) of the valve body 35 has decreased rapidly due to a foreign object getting caught in the control valve 26. The rapid decrease determination unit 54 determines that the rotation speed of the valve body 35 has decreased rapidly, when all of the three conditions listed below are met. However, the rapid decrease determination unit 54 does not determine that the rotation speed of the valve body 35 has decreased rapidly, when at least one of the three conditions is not met. Rotation of the motor 37 is transmitted to the valve body 35 through the transmission mechanism 38. Thus, there is a correlation between the angular speed ω of the motor 37 and the rotation speed of the valve body 35.

The angular acceleration rate Dω derived by the angular acceleration rate derivation unit 53 is equal to or lower than a criterial angular acceleration rate DωTh.

A last-time value ω (N−1) of the angular speed ω derived by the angular speed derivation unit 52 is equal to or higher than a first reference angular speed ωTh1 as a reference acceleration rate.

A latest value ω (N) of the angular speed ω derived by the angular speed derivation unit 52 is equal to or lower than a second reference angular speed ωTh2 that is lower than the first reference angular speed ωTh1.

The criterial angular acceleration rate DωTh is a threshold value for determining whether or not the amount of decrease in the angular speed ω of the motor 37 is large. Therefore, the criterial angular acceleration rate DωTh is set to a negative value. The first reference angular speed ωTh1 is a threshold value for determining whether or not the angular speed ω has been high. The second reference angular speed ωTh2 is a threshold value for determining whether or not the angular speed ω has become lower.

Thus, it is determined that the rotation speed of the valve body 35 has decreased rapidly due to a foreign object getting caught in the control valve 26, when all of the following conditions are met: that the angular acceleration rate Dω is equal to or lower than the criterial angular acceleration rate DωTh; that the last-time value ω (N−1) of the angular speed is equal to or higher than the first reference angular speed ωTh1; and that the latest value ω (N) of the angular speed is equal to or lower than the second reference angular speed ωTh2. However, it is not determined that the rotation speed of the valve body 35 has decreased rapidly, when at least one of the following conditions is not met: that the angular acceleration rate Dω is equal to or lower than the criterial angular acceleration rate DωTh; that the last-time value ω (N−1) of the angular speed is equal to or higher than the first reference angular speed ωTh1; and that the latest value ω (N) of the angular speed is equal to or lower than the second reference angular speed ωTh2.

When the rotation speed of the valve body 35 decreases rapidly due to a foreign object getting caught in the control valve 26, the gears 39 experience a stress resulting from the foreign object getting caught in the control valve 26. The stress that the gears 39 experience in this case tends to become larger as the angular speed ω of the motor 37 immediately before the decrease in the rotation speed due to the foreign object getting caught in the control valve 26 becomes higher. Therefore, when the last-time value ω (N−1) of the angular speed is equal to or higher than the first reference angular speed ωTh1 and, moreover, the other two conditions are met, it can be inferred that a relatively large amount of stress will build up in the gears 39 due to the foreign object getting caught in the control valve 26.

The basic torque derivation unit 55 derives a basic torque TQB based on the duty ratio DT of the voltage signal input into the motor 37 and the outlet cooling liquid temperature Twt. The basic torque TQB refers to a torque that is generated by the motor 37 when the voltage signal is input into the motor 37 under the condition that the angular speed ω of the motor 37 is equal to a specified value (e.g., 0). As described above, the cooling liquid having flowed out of the cylinder head 12 flows into the control valve 26. Therefore, the temperature of a constituent member of the control valve 26 is correlated with the outlet cooling liquid temperature Twt. Thus, the basic torque TQB is a value that is derived based on the duty ratio DT of the voltage signal and on a value correlated with the temperature of the constituent member of the control valve 26. Examples of the constituent member of the control valve 26 include the gears 39 of the transmission mechanism 38, the valve body 35, and a seal ring (not shown).

Figure 7:
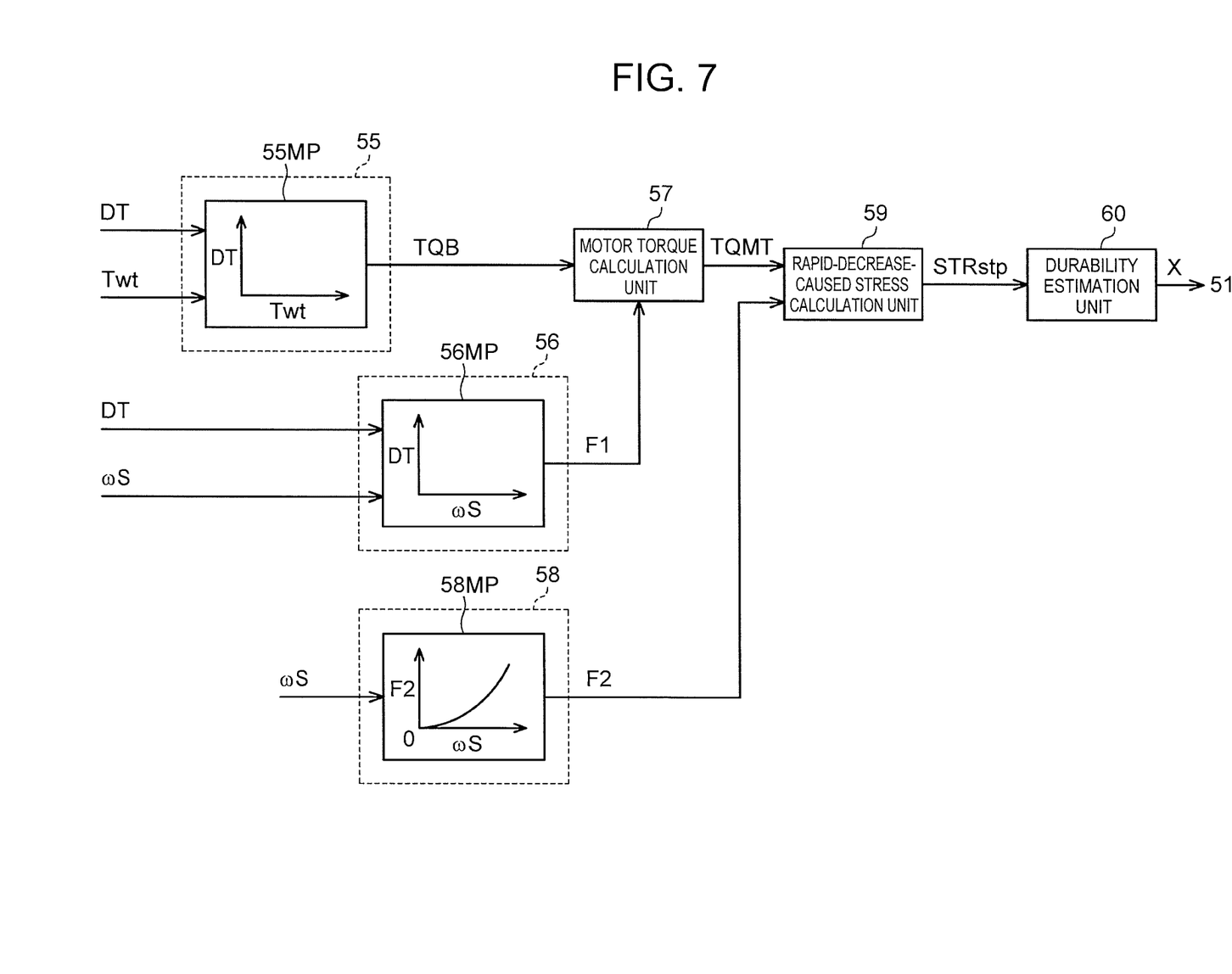
FIG. 7 is a block diagram showing a functional configuration of the electronic control unit.
Figure 8:
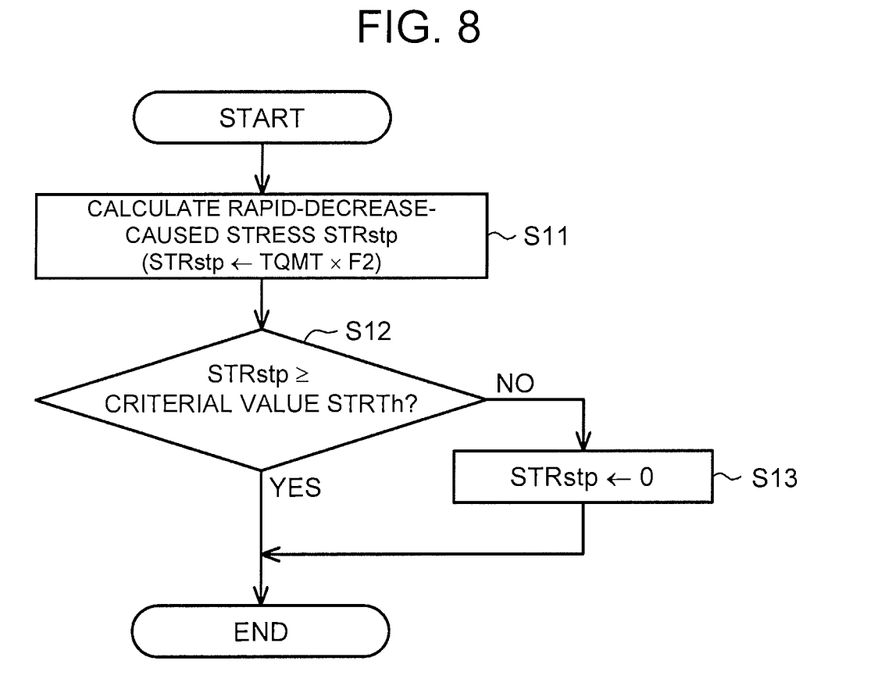
FIG. 8 is a flowchart showing a processing routine executed to calculate a rapid-decrease-caused stress that is a stress that gears experience upon input of an impact into the control valve.

As shown in FIG. 7, the basic torque derivation unit 55 stores a basic torque derivation map 55MP used to derive the basic torque TQB based on a relation between the duty ratio DT of the voltage signal and the outlet cooling liquid temperature Twt. The basic torque derivation unit 55 derives the basic torque TQB by using the basic torque derivation map 55MP.

The basic torque TQB tends to become larger as the effective voltage applied to the motor 37 becomes higher. Therefore, the basic torque derivation map 55MP is created such that the value of the basic torque TQB becomes larger as the duty ratio DT of the voltage signal becomes higher and therefore the effective voltage becomes higher.

The hardness of the constituent member of the control valve 26 varies with the temperature of the constituent member. The hardness of the constituent member affects the magnitude of the stress that the gears 39 experience when the rotation of the valve body 35 is restricted due to a foreign object getting caught in the control valve 26. Therefore, the basic torque derivation map 55MP is created such that the basic torque TQB varies with the outlet cooling liquid temperature Twt correlated with the temperature of the constituent member.

The correction factor derivation unit 56 calculates a correction factor F1 based on the duty ratio DT of the voltage signal and on a smoothed angular speed value ωS that is a value obtained by smoothing the angular speed ω by a moving-average process. The correction factor F1 is a factor with which the basic torque TQB is corrected to obtain the motor torque TQMT. The smoothed angular speed value ωS is calculated based on a plurality of angular speeds ω that has been consecutively derived. The angular speeds ω used to calculate the smoothed angular speed value ωS include the latest value ω (N) of the angular speed.

As shown in FIG. 7, the correction factor derivation unit 56 stores a correction factor derivation map 56MP used to derive the correction factor F1 based on the duty ratio DT of the voltage signal and the smoothed angular speed value ωS. The correction factor derivation unit 56 derives the correction factor F1 by using the correction factor derivation map 56MP.

As will be described in detail later, the correction factor F1 is a factor used to calculate the motor torque TQMT that is a torque generated by the motor 37. The value of the motor torque TQMT becomes larger as the correction factor F1 becomes larger. The motor torque TQMT becomes larger as the effective voltage applied to the motor 37 becomes higher. Therefore, the correction factor derivation map 56MP is created such that the correction factor F1 becomes larger as the duty ratio DT of the voltage signal becomes higher and therefore the effective voltage becomes higher.

The gap between the basic torque TQB and the torque that is actually being generated by the motor 37 tends to become wider, as the deviation of the current angular speed ω from the specified value that is the angular speed used to derive the basic torque TQB becomes larger. For example, when the current angular speed ω is higher than the specified value, the motor torque TQMT becomes smaller as the difference between the specified value and the current angular speed ω becomes larger. The smoothed angular speed value ωS is correlated with the current angular speed ω.

Therefore, the correction factor derivation map 56MP is created such that the correction factor F1 becomes larger as the smoothed angular speed value ωS becomes smaller.

The motor torque calculation unit 57 calculates, as the motor torque TQMT, the product of the basic torque TQB calculated by the basic torque derivation unit 55 and the correction factor F1 calculated by the correction factor derivation unit 56. Thus, the motor torque TQMT becomes larger as the product of the basic torque TQB and the correction factor F1 becomes larger. The duty ratio DT of the voltage signal input into the motor 37 is a value correlated with the effective voltage applied to the motor 37. Therefore, the motor torque TQMT can be said to be a value according to the effective voltage.

The collision factor derivation unit 58 derives a collision factor F2 based on the smoothed angular speed value ωS. The collision factor F2 is a factor used to convert the motor torque TQMT into a stress that the gears 39 experience as a result of a rapid decrease in the rotation speed of the valve body 35 due to a foreign object getting caught in the control valve 26. As shown in FIG. 7, the collision factor derivation unit 58 stores a collision factor derivation map 58MP used to derive the collision factor F2 based on the smoothed angular speed value ωS. The collision factor derivation unit 58 derives the collision factor F2 by using the collision factor derivation map 58MP.

When the rotation speed of the valve body 35 decreases rapidly due to a foreign object getting caught in the control valve 26 while the motor 37 is driven to rotate the valve body 35, an impact resulting from the rapid decrease in the rotation speed is input into the gears 39 that are located between the motor 37 and the valve body 35 in the torque transmission path. The stress that the gears 39 experience upon input of such an impact tends to become larger as the angular speed ω immediately before the rapid decrease in the rotation speed of the valve body 35 becomes higher. As will be described in detail later, the collision factor F2 is a factor used to calculate the rapid-decrease-caused stress STRstp. The value of the rapid-decrease-caused stress STRstp becomes larger as the collision factor F2 becomes larger. Therefore, the collision factor derivation map 58MP is created such that the collision factor F2 becomes larger as the smoothed angular speed value ωS becomes larger.

The smoothed angular speed value ωS is calculated based on the latest value ω (N) of the angular speed derived by the angular speed derivation unit 52 and on the angular speed ω derived before the latest value ω (N) is derived. Thus, the smoothed angular speed value ωS is a value reflecting also the angular speed ω shortly before the time of derivation of the latest value ω (N). Therefore, even when the collision factor F2 is derived at a point in time when it is determined by the rapid decrease determination unit 54 that the rotation speed of the valve body 35 has decreased rapidly, the smoothed angular speed value ωS reflecting also the angular speed ω before the determination is made is used to derive the collision factor F2. Thus, by using the collision factor derivation map 58MP, it is possible to make the collision factor F2 larger as the angular speed ω immediately before a rapid decrease in the rotation speed of the valve body 35 due to a foreign object getting caught in the control valve 26 becomes higher.

When it is determined by the rapid decrease determination unit 54 that the rotation speed of the valve body 35 has decreased rapidly, the rapid-decrease-caused stress calculation unit 59 calculates the rapid-decrease-caused stress STRstp. A processing routine executed by the rapid-decrease-caused stress calculation unit 59 to calculate the rapid-decrease-caused stress STRstp will be described with reference to FIG. 8. This processing routine is executed when it is determined by the rapid decrease determination unit 54 that the rotation speed of the valve body 35 has decreased rapidly.

In step S11 of this processing routine, the product of the motor torque TQMT calculated by the motor torque calculation unit 57 and the collision factor F2 derived by the collision factor derivation unit 58 is calculated as the rapid-decrease-caused stress STRstp. Thus, the rapid-decrease-caused stress STRstp becomes larger as the product of the motor torque TQMT and the collision factor F2 becomes larger. Subsequently, in step S12, it is determined whether or not the calculated rapid-decrease-caused stress STRstp is equal to or larger than a criterial value STRTh.

When the rapid-decrease-caused stress STRstp calculated in step S11 is not so large, it is inferred that the impact input into the gears 39 as a result of the rapid decrease in the rotation speed of the valve body 35 is not so large. If the impact input into the gears 39 is small, little damage will actually remain in the gears 39. The criterial value STRTh is set as a criterion for determining whether or not such an impact as to leave damage in the gears 39 has been input into the gears 39. Therefore, when the rapid-decrease-caused stress STRstp is equal to or larger than the criterial value STRTh, it is determined that such an impact as to leave damage in the gears 39 has been input into the gears 39. On the other hand, when the rapid-decrease-caused stress STRstp is smaller than the criterial value STRTh, it is determined that no damage will remain in the gears 39 even when an impact is input into the gears 39.

In step S12, when the rapid-decrease-caused stress STRstp is equal to or larger than the criterial value STRTh (YES), the current processing routine is ended. On the other hand, when the rapid-decrease-caused stress STRstp is smaller than the criterial value STRTh (S12: NO), the process flow moves to the next step S13. In step S13, the rapid-decrease-caused stress STRstp is changed to zero. Then, the current processing routine is ended.

As shown in FIG. 7, by using the rapid-decrease-caused stress STRstp calculated by the rapid-decrease-caused stress calculation unit 59, the durability estimation unit 60 calculates an index X indicating the durability of the control valve 26. Specifically, when the rapid-decrease-caused stress STRstp is calculated by the rapid-decrease-caused stress calculation unit 59, i.e., when the processing routine shown in FIG. 8 is ended, the durability estimation unit 60 performs a process of integrating the rapid-decrease-caused stress STRstp. When an integrated value ΣSTRstp of the rapid-decrease-caused stress STRstp calculated by the integration process is larger, it can be inferred that a larger amount of damage remains in the gears 39 and that the durability of the control valve 26 has become lower. Therefore, the durability estimation unit 60 calculates the index X so as to have a larger value as the integrated value ΣSTRstp becomes larger. In other words, the index X becomes larger as the durability of the control valve 26 becomes lower.

Based on the index X calculated by the durability estimation unit 60, the motor control unit 51 determines an upper limit DTul and a lower limit DTll of the duty ratio of the voltage signal. In this case, the motor control unit 51 determines the upper limit DTul and the lower limit DTll such that the absolute values of the upper limit DTul and the lower limit DTll become smaller as the index X becomes larger.

Moreover, the motor control unit 51 calculates a calculated duty ratio DTC that is a calculated value of the duty ratio of the voltage signal input into the motor 37, by performing feedback control using, as an input, the deviation of the rotation angle θ of the motor 37 from a target rotation angle θTr that is a target for the rotation angle of the motor 37. Then, the motor control unit 51 determines the duty ratio DT of the voltage signal based on the calculated duty ratio DTC and the upper and lower limits DTul, DTll. Specifically, when the calculated duty ratio DTC is not higher than the upper limit DTul nor lower than the lower limit DTll, the motor torque calculation unit 57 sets the duty ratio DT of the voltage signal to the same value as the calculated duty ratio DTC. When the calculated duty ratio DTC is higher than the upper limit DTul, the motor torque calculation unit 57 sets the duty ratio DT of the voltage signal to the same value as the upper limit DTul. When the calculated duty ratio DTC is lower than the lower limit DTll, the motor torque calculation unit 57 sets the duty ratio DT of the voltage signal to the same value as the lower limit DTll.

The effective voltage applied to the motor 37 can be calculated based on the duty ratio DT of the voltage signal input into the motor 37 and the power source voltage of the motor 37. Therefore, it can also be said that the motor control unit 51 applies to the motor 37 an effective voltage according to the deviation of the rotation angle θ from the target rotation angle θTr.

Next, the workings and effects of this embodiment will be described with reference to FIG. 9. When the target rotation angle θTr is changed and a deviation of the rotation angle θ of the motor 37 from the target rotation angle θTr occurs, the motor 37 starts to be driven. Specifically, the calculated duty ratio DTC is calculated by feedback control using, as an input, the deviation of the rotation angle θ from the target rotation angle θTr, and the duty ratio DT of the voltage signal is determined based on the calculated duty ratio DTC. Then, an effective voltage based on the determined duty ratio DT and the power source voltage of the motor 37 starts to be applied to the motor 37. As a result, the motor 37 is driven to rotate the valve body 35, so that the deviation of the rotation angle θ from the target rotation angle θTr decreases.

A foreign object may flow into the housing 31 of the control valve 26 along with the cooling liquid while the motor 37 is thus driven to rotate the valve body 35. In this case, if the foreign object gets caught in the control valve 26, rotation of the valve body 35 may be restricted.

Figure 9:
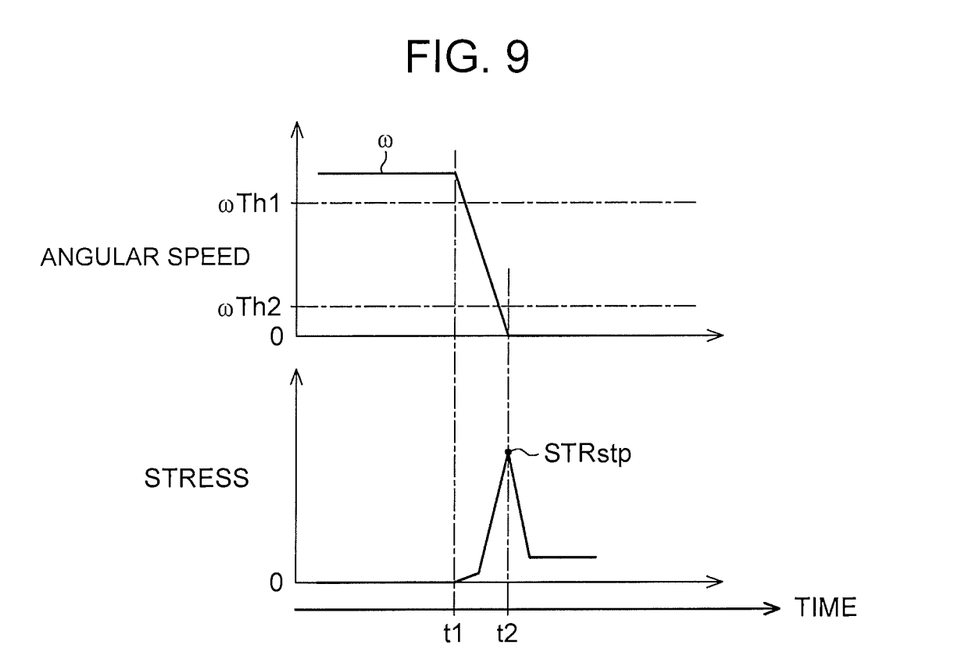
FIG. 9 is a timing chart showing changes, resulting from a foreign object getting caught in the control valve, in the angular speed of a motor of the control valve and in the stress that the gears experience.

FIG. 9 shows an example in which rotation of the valve body 35 is restricted due to a foreign object getting caught in the control valve 26 at timing t1 that is when the motor 37 is being driven to rotate the valve body 35. When the rotation of the valve body 35 is thus restricted, the angular speed ω of the motor 37 decreases rapidly as shown in FIG. 9. In this case, it is determined that the rotation speed of the valve body 35 has decreased rapidly, when the angular acceleration rate Dω derived by the angular acceleration rate derivation unit 53 at timing t2 is equal to or lower than the criterial angular acceleration rate DωTh; the angular speed ω derived by the angular speed derivation unit 52 at timing t2 is equal to or lower than the second reference angular speed ωTh2; and the angular speed ω derived by the angular speed derivation unit 52 at timing t1 that is the last-time control cycle is equal to or higher than the first reference angular speed ωTh1. Then, the rapid-decrease-caused stress STRstp is calculated.

Here, even when the rotation of the valve body 35 is restricted due to a foreign object getting caught in the control valve 26, the impact input into the gears 39 as a result of the foreign object getting caught in the control valve 26 is small if the angular speed ω before the restriction occurs is not so high. Moreover, even when the rotation of the valve body 35 is restricted due to a foreign object getting caught in the control valve 26, the impact input into the gears 39 as a result of the foreign object getting caught in the control valve 26 is small if the amount of change in the angular speed ω between before and after the restriction occurs is small. If the impact is thus small, little damage will remain in the gears 39.

In this embodiment, it is not determined that the rotation speed of the valve body 35 has decreased rapidly, when at least one of the following conditions is not met: that the angular acceleration rate Dω is equal to or lower than the criterial angular acceleration rate DωTh; that the last-time value ω (N−1) of the angular speed ω is equal to or higher than the first reference angular speed ωTh1; and that the latest value ω (N) of the angular speed ω is equal to or lower than the second reference angular speed ωTh2. In other words, the rapid-decrease-caused stress STRstp is not calculated when at least one of these conditions is not met. Thus, it is possible to avoid calculating the rapid-decrease-caused stress STRstp in the case where the rotation speed of the valve body 35 has decreased but it is assumed that the impact input into the gears 39 is small and that no stress will build up in the gears 39.

In the example shown in FIG. 9, it is determined at timing t2 that the rotation speed of the valve body 35 has decreased rapidly, so that the rapid-decrease-caused stress STRstp is calculated. To calculate the rapid-decrease-caused stress STRstp, the motor torque TQMT calculated by the motor torque calculation unit 57 and the collision factor F2 derived by the collision factor derivation unit 58 are used.

The motor torque TQMT is equal to the product of the basic torque TQB derived by the basic torque derivation unit 55 and the correction factor F1 derived by the correction factor derivation unit 56. The basic torque TQB is a value derived based on the duty ratio DT of the voltage signal input into the motor 37 and the outlet cooling liquid temperature Twt. The duty ratio DT is a value correlated with the effective voltage applied to the motor 37, and the outlet cooling liquid temperature Twt is a value correlated with the hardness of the gears 39 disposed in the torque transmission path from the motor 37 to the valve body 35. Therefore, by deriving the basic torque TQB based on the duty ratio DT and the outlet cooling liquid temperature Twt, it is possible to set the basic torque TQB to a value according to the effective voltage and the hardness of the gear 39 at that time.

The correction factor F1 is derived based on the duty ratio DT of the voltage signal and the smoothed angular speed value ωS. The duty ratio DT is a value correlated with the effective voltage applied to the motor 37. As described above, the smoothed angular speed value ωS is a value reflecting the angular speed ω before timing t2, i.e., the angular speed ω before the rotation of the valve body 35 is restricted due to a foreign object getting caught in the control valve 26. Therefore, by deriving the correction factor F1 based on the duty ratio DT and the smoothed angular speed value ωS, it is possible to set the correction factor F1 to a value according to the effective voltage at that time and the angular speed ω before the rotation of the valve body 35 is restricted due to a foreign object getting caught in the control valve 26.

Since the motor torque TQMT is calculated based on these basic torque TQB and correction factor F1, the motor torque TQMT can be calculated with good accuracy even when the rotation of the valve body 35 is restricted due to a foreign object getting caught in the control valve 26.

The collision factor F2 is derived based on the smoothed angular speed value ωS. As described above, the smoothed angular speed value ωS is a value reflecting the angular speed ω before timing t2, i.e., the angular speed ω before the rotation of the valve body 35 is restricted due to a foreign object getting caught in the control valve 26. It is therefore possible to set the collision factor F2 to a value according to the angular speed ω before the rotation of the valve body 35 is restricted due to a foreign object getting caught in the control valve 26.

The stress that the gears 39 experience upon input of an impact resulting from a foreign object getting caught in the control valve 26 tends to become larger as the motor torque TQMT becomes larger. This stress tends to become larger as the angular speed ω immediately before the rapid decrease in the rotation speed of the valve body 35 becomes higher. In this embodiment, the rapid-decrease-caused stress STRstp is calculated by the rapid-decrease-caused stress calculation unit 59 as the product of the motor torque TQMT and the collision factor F2 derived as described above. Therefore, the rapid-decrease-caused stress STRstp can be made larger as the motor torque TQMT becomes larger and as the angular speed ω immediately before the rapid decrease in the rotation speed of the valve body 35 becomes higher. Thus, it is possible to calculate the rapid-decrease-caused stress STRstp that is a stress that the gears 39 experience, even when the rotation of the valve body 35 is restricted due to a foreign object getting caught in the control valve 26.

If a foreign object gets caught in the control valve 26, the stress that the gears 39 experience increases rapidly after some time has elapsed since timing t1 as shown in FIG. 9. This stress reaches its peak at timing t2, and decreases from timing t2. The rapid-decrease-caused stress STRstp calculated by the rapid-decrease-caused stress calculation unit 59 has a peak value of the stress that the gears 39 experience or a value correlated with this peak value.

When the rapid-decrease-caused stress STRstp is calculated, the durability of the control valve 26 is estimated by the durability estimation unit 60. Specifically, when the integrated value ΣSTRstp of the rapid-decrease-caused stress calculated by the rapid-decrease-caused stress calculation unit 59 is larger, it can be inferred that a larger amount of damage has built up in the gears 39. As the amount of built-up damage increases, the durability of the control valve 26 decreases. In this embodiment, the index X is calculated based on the integrated value ΣSTRstp of the rapid-decrease-caused stress. The value of the index X becomes larger as the estimated durability of the control valve 26 becomes lower.

When the index X is thus calculated, the upper limit DTul and the lower limit DTll of the duty ratio are calculated based on the index X. The absolute values of the upper limit DTul and the lower limit DTll become smaller as the index X becomes larger and the durability of the control valve 26 becomes lower. The duty ratio DT of the voltage signal input into the motor 37 is determined so as to have a value between the upper limit DTul and the lower limit DTll. Thus, when the durability of the control valve 26 is lower, the rotation speed of the valve body 35 when rotated is less likely to become high. The load placed on the transmission mechanism 38 is less likely to become large when the effective voltage applied to the motor 37 is lower and the rotation speed of the valve body 35 is lower.

Once a foreign object starts to flow along with the cooling liquid in the circulation circuit 21, an incident of a foreign object getting caught in the control valve 26 can occur many times repeatedly. If this incident occurs repeatedly, the durability of the control valve 26 will decrease gradually. In this embodiment, the rotation speed of the valve body 35 is less likely to become high when the durability of the control valve 26 has become low, compared with when the durability has not yet become low. Thus, the stress that the gears 39 experience when an incident of a foreign object getting caught in the control valve 26 recurs can be reduced.

Varying the upper limit of the rotation speed of the valve body 35 according to the durability of the control valve 26 can therefore extend the product life of the control valve 26. This embodiment can further achieve the following effects.

When the impact input into the gears 39 as a result of a foreign object getting caught in the control valve 26 is small, it can be inferred that little damage will remain in the gears 39. Therefore, when the rapid-decrease-caused stress STRstp calculated as the product of the motor torque TQMT and the correction factor F1 is smaller than the criterial value STRTh, the rapid-decrease-caused stress STRstp is set to zero. This can prevent the index X from being updated when such an impact as to leave little damage in the gears 39 is input into the gears 39. As a result, it is possible to avoid evaluating the durability of the control valve 26 to be excessively low.

The above embodiment can be implemented with the following modifications made thereto. The above embodiment and the following modified examples can be implemented in combination within such a range that no technical inconsistency arises.

In the above embodiment, the index X is calculated so as to have a larger value as the integrated value ΣSTRstp of the rapid-decrease-caused stress becomes larger. A parameter other than the integrated value ΣSTRstp may also be used to calculate the index X. When the number of times the rapid-decrease-caused stress STRstp has become equal to or larger than the criterial value STRTh is larger, it can be inferred that the durability of the control valve 26 has become lower. Therefore, for example, the index X may be calculated so as to have a larger value as the number of times the rapid-decrease-caused stress STRstp has become equal to or larger than the criterial value STRTh increases.

It is not essential to set the rapid-decrease-caused stress STRstp to zero when the rapid-decrease-caused stress STRstp calculated as the product of the motor torque TQMT and the collision factor F2 is smaller than the criterial value STRTh.

To determine the duty ratio DT of the voltage signal, the product of the calculated duty ratio DTC and a duty ratio correction factor according to the index X may be used as the duty ratio DT. In this case, it is preferable to make the duty ratio correction factor smaller as the index X becomes larger and the durability of the control valve 26 becomes lower. Thus, when the durability of the control valve 26 is lower, the duty ratio DT of the voltage signal input into the motor 37 is less likely to become high, i.e., the effective voltage applied to the motor 37 is less likely to become high. As a result, the product life of the control valve 26 can be extended.

When the angular acceleration rate Dω is equal to or lower than the criterial angular acceleration rate DωTh, it may be determined that the rotation speed of the valve body 35 has decreased rapidly, regardless of whether or not the last-time value ω (N−1) of the angular speed is equal to or higher than the first reference angular speed ωTh1.

When the angular acceleration rate Dω is equal to or lower than the criterial angular acceleration rate DωTh, it may be determined that the rotation speed of the valve body 35 has decreased rapidly, regardless of whether or not the latest value ω (N) of the angular speed is equal to or lower than the second reference angular speed ωTh2.

To derive the basic torque TQB, the outlet cooling liquid temperature Twt is used as the value correlated with the temperature of the constituent member of the control valve 26 in the above embodiment. However, when a sensor that detects the temperature of the constituent member of the control valve 26 is provided, the basic torque TQB may be derived by using the temperature of the constituent member detected by this sensor, instead of the outlet cooling liquid temperature Twt.

If a variation in the basic torque TQB resulting from a variation in the temperature of the constituent member of the control valve 26 does not significantly affect the calculation of the rapid-decrease-caused stress STRstp, the temperature of the constituent member or the value correlated with the temperature of the constituent member need not be used to derive the basic torque TQB.

To derive the correction factor F1, the smoothed angular speed value ωS is used in the above embodiment. However, when the angular speed ω before it is determined that the rotation speed of the valve body 35 has decreased rapidly is stored in the electronic control unit 50, the correction factor F1 may be derived by using the angular speed ωbefore the determination is made, instead of the smoothed angular speed value ωS.

A value obtained by multiplying the product of the basic torque TQB and the correction factor F1 by a predetermined gain may be used as the motor torque TQMT. Also, in this case, the value of the motor torque TQMT can be made larger as the product of the basic torque TQB and the correction factor F1 becomes larger.

A control valve different in configuration from the control valve 26 may be used, as long as the control valve is configured to be able to change the flow of the cooling liquid in the circulation circuit 21 as the valve body shifts inside the housing. For example, a control valve may be used that is configured to be able to change the flow of the cooling liquid in the circulation circuit 21 by having the valve body sliding inside the housing.

What is claimed is:

1. A cooling device of an internal combustion engine, the cooling device comprising:
a control valve provided in a circulation circuit of a cooling liquid flowing inside the internal combustion engine, the control valve including a housing, a valve body that shifts inside the housing, a motor, and a transmission mechanism that includes a plurality of gears meshing with one another and is configured to transmit an output of the motor to the valve body, the control valve being configured to control a flow of the cooling liquid in the circulation circuit by driving the motor so as to shift the valve body; and
an electronic control unit configured to:
control driving of the motor;
derive an angular speed of the motor;
derive an angular acceleration rate that is an amount of change in the angular speed of the motor;
determine that a shifting speed of the valve body has decreased rapidly, when the angular acceleration rate while the motor is driven to adjust a position of the valve body is equal to or lower than a criterial angular acceleration rate;
calculate a motor torque that is a torque generated by the motor based on an effective voltage applied to the motor;
derive a collision factor so as to become larger as a smoothed angular speed value that is a value obtained by smoothing the angular speed becomes larger; and
calculate a rapid-decrease-caused stress that is a stress that the gears experience as a result of a rapid decrease in the shifting speed of the valve body, so as to become larger as a product of the motor torque and the collision factor becomes larger, when the electronic control unit determines that the shifting speed of the valve body has decreased rapidly.

2. The cooling device according to claim 1, wherein the electronic control unit is configured to:
derive a basic torque so as to become larger as the effective voltage becomes higher;
derive a correction factor so as to become larger as the effective voltage becomes higher and as the smoothed angular speed value becomes smaller; and
calculate the motor torque so as to become larger as a product of the basic torque and the correction factor becomes larger.

3. The cooling device according to claim 2, wherein the electronic control unit is configured to derive the basic torque based on the effective voltage and on a temperature of a constituent member of the control valve or a value correlated with the temperature of the constituent member.

4. The cooling device according to claim 1, wherein the electronic control unit is configured to:
derive the angular speed once every control cycle; and
determine that the shifting speed of the valve body has decreased rapidly, when the angular acceleration rate while the motor is driven to adjust the position of the valve body is equal to or lower than the criterial angular acceleration rate and, moreover, a last-time value of the angular speed is equal to or higher than a reference angular speed.

5. The cooling device according to claim 1, wherein the electronic control unit is configured to:
calculate an index of durability of the control valve;
set the effective voltage lower as the durability of the control valve estimated based on the index becomes lower; and
integrate the rapid-decrease-caused stress, and calculate the index so as to have a value indicating lower durability of the control valve as an integrated value becomes larger.

6. The cooling device according to claim 5, wherein the electronic control unit is configured to set the rapid-decrease-caused stress to zero when the calculated rapid-decrease-caused stress is smaller than a criterial value.

7. The cooling device according to claim 5, wherein the electronic control unit is configured to calculate the index so as to have a value indicating lower durability of the control valve as the number of times the rapid-decrease-caused stress has become equal to or larger than a criterial value is larger.

* * * * *